United States Patent

[11] 3,578,252

[72] Inventor John C. Brewer
 Salt Lake City, Utah
[21] Appl. No. 783,665
[22] Filed Dec. 13, 1968
[45] Patented May 11, 1971
[73] Assignee Garbalizer Corporation of America
 Salt Lake City, Utah

[54] INDUSTRIAL SHREDDING APPARATUS
 22 Claims, 8 Drawing Figs.
[52] U.S. Cl. ................................................. 241/141,
 241/220, 241/224, 241/243
[51] Int. Cl. ....................................................... B02c 18/06
[50] Field of Search ........................................... 241/134,
 136, 139, 141, 142, 146, 155, 158, 160, 220, 221,
 224, 238, 243, 241

[56] References Cited
 UNITED STATES PATENTS
 529,796 11/1894 Johnson ....................... 241/243
 2,562,282 7/1951 Nickle et al .................. 241/141

Primary Examiner—Theron E. Condon
Assistant Examiner—Robert L. Spruill
Attorney—M. Ralph Shaffer ABSTRACT: The present invention comprises an industrial shredding apparatus which is usable in shredding many types of industrial waste, garbage, trash, and so forth. The shredding apparatus incorporates a pair of oppositely revolving shafts upon which are mounted respective sets of knives or cutting blades disposed such that the tips thereof form, compositely, helixlike configuration relative to each of the respective shafts. The blades are so arranged that they serve both in holding debris for cutting by adjacent blades, and, additionally, for cutting themselves in their own turn. The shredding mechanism is designed such that the cutting is done centrally of the apparatus, with associated structure being designed for urging debris falling thereon toward a central position relative to the apparatus. The device is ideally suited for shearing and/or cutting debris and allowing the same to pass through the shredder onto a transport conveyer, for example.

Patented May 11, 1971

INVENTOR.
JOHN C. BREWER
BY
HIS ATTORNEY

INVENTOR.
JOHN C. BREWER
BY
HIS ATTORNEY

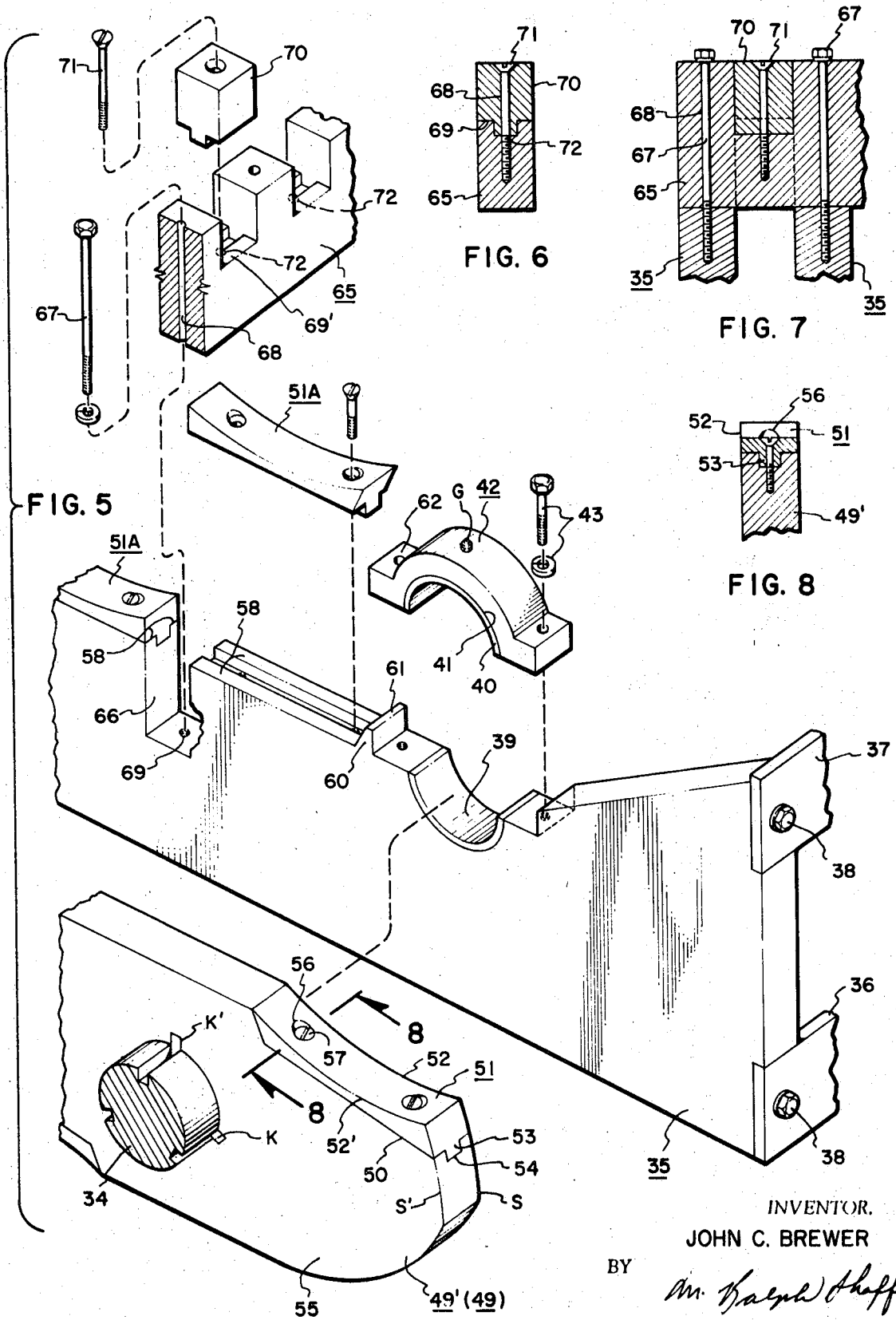

INDUSTRIAL SHREDDING APPARATUS

The present invention relates to industrial shredders and, more particularly, to a new and improved shredding apparatus which is ideally suitable for cutting garbage, trash, and industrial waste into small pieces so as to permit the same to be dropped onto a conveyor belt or otherwise handled for convenient and satisfactory processing and/or disposal.

The essence of the invention resides in its feature of having a pair of oppositely revolving shafts upon which are mounted respective sets of mutually spaced knives or blades which are angularly displaced so that each set forms, in effect a blade tip helix about the shaft upon which they are mounted. The blades, hence, serve to effect a continuous shearing or cutting operation and, in addition to cutting, allow the blades to hold objects proximately center of the shearing apparatus and to retain the same proximate the provided cutter bars so that blades may easily perform their intended cutting or shearing function.

Accordingly, a principal object of the present invention is to provide a new and improved shredding apparatus.

An additional object is to provide an improved shredding apparatus for shearing and/or cutting garbage or other debris into small pieces to facilitate adequate and convenient disposal or processing thereof.

An additional object is to provide a blade structure in a shearing mechanism wherein the blades serve not only a cutting or shearing function but also enable a holddown of debris being cut until advancing blades descend to actually perform the cutting function.

An additional object is to provide, proximate a hopper construction, a shredding apparatus which, by its nature, will receive material deposited into the hopper for transporting the same centrally thereof, through the shredding apparatus, and subsequent deposit in a restricted area.

An additional object is to provide a shredding construction wherein a shredding construction is structurally affixed to and contained within a hopper, this to receive materials deposited therein and to continuously cut and/or shred the material for subsequent processing or disposal.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

in FIG. 3, at the left-hand side of the structure, the outmost support base is cut away to reveal the blade structure and its mounting to its respective shaft.

FIG. 5 is an enlarged, exploded view of a fragmentary portion of a representative support base, a cutter blade cooperating therewith, and allied structure.

FIG. 6 is a fragmentary section taken along the line 6–6 in FIG. 4.

FIG. 7 is a fragmentary section taken along the line 7–7 in FIG. 3.

FIG. 8 is a fragmentary section taken along the line 8–8 of the lower portion of FIG. 5.

Figures 1, 2:
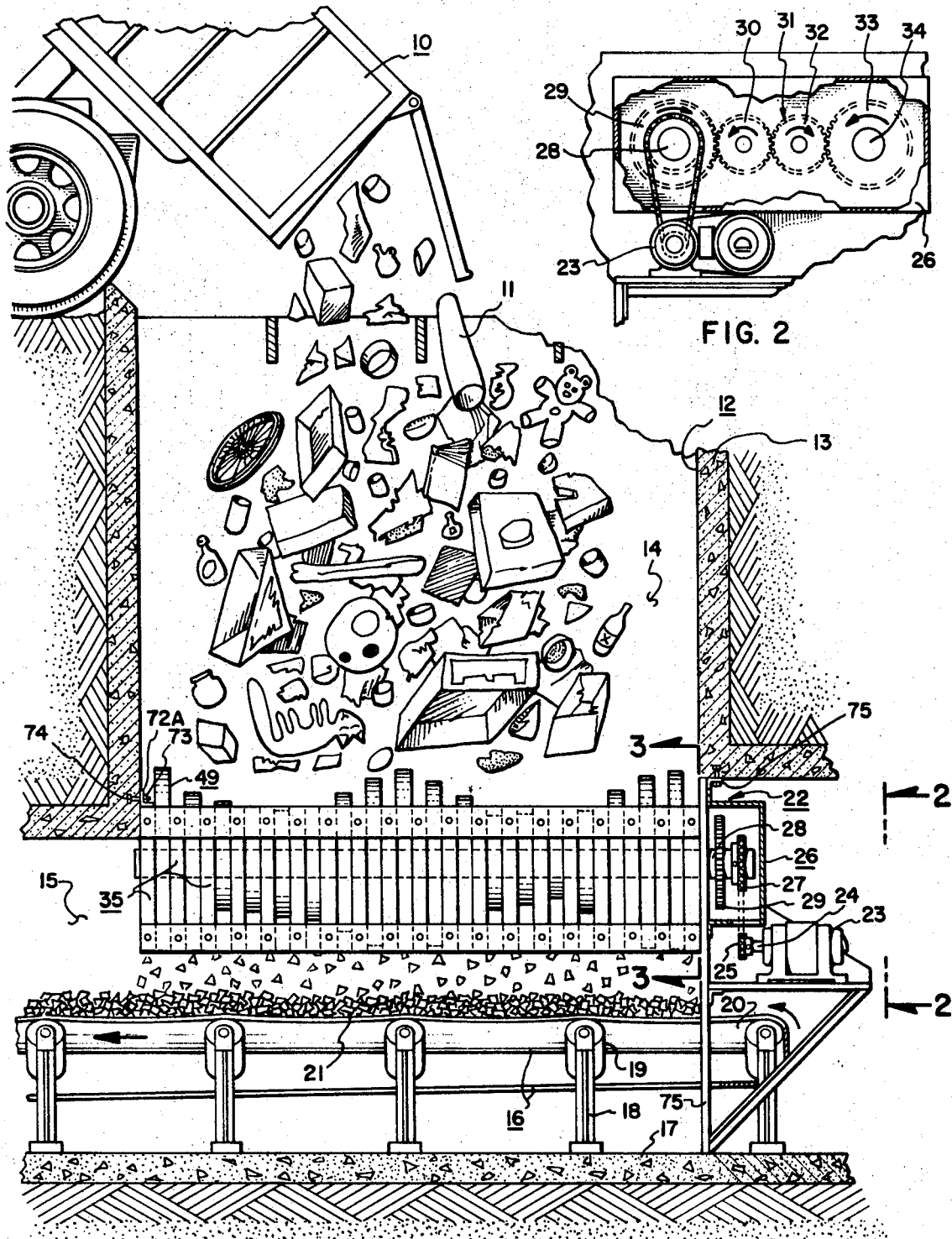
FIG. 1 is a side elevation, partially in section, of a shredding and conveying system for shredding debris, which system incorporates the features of the present invention.
FIG. 2 is a fragmentary side elevation of the structure in FIGURE 1 and is taken along the line 2–2 thereof.

In FIG. 1 the truck 10 is shown dumping a load of debris 11 into hopper 12. Hopper 12 may be a cement casing 13 surrounding a central receiving aperture 14. In the drawing, illustrated hopper 12 is contiguous with and communicates with an open passageway 15 which is disposed below ground and which includes conveyor system 16. Floor 17 may be cement and supports, via stands 18, a plurality of conveyor rollers 19. These latter support a traveling conveyor belt 20 in the usual manner. Any conventional conveyor system as typified by the numeral 16 may be employed to transport the shredded material 21 to the left of the viewer, for subsequent processing.

An important feature in the present invention resides in the inclusion of shredding apparatus which is disposed beneath the hopper 12 and between hopper 12 and conveyor system 16.

In FIG. 1 the shredding apparatus 22 includes power means arrows such as a variable drive motor the output shaft 24 of which includes a sprocket or other drive means 25 for driving the contents of gear box 26. The latter may include a drive sprocket 27 keyed to shaft 28. A gear 29 is also keyed to shaft 28 and meshes with the spur gear 30. Included within gear train 31, see FIG. 2, is a spur gear 32 meshing with gear 30, and which likewise meshes with gear 33 affixed to shaft 34. It will be seen, therefore, that shafts 28 and 34 are mutually spaced and are mutually oppositely revolving such that their upper peripheries mutually advance toward each other as shown by the indicated arrows in FIG. 2.

Figure 3:
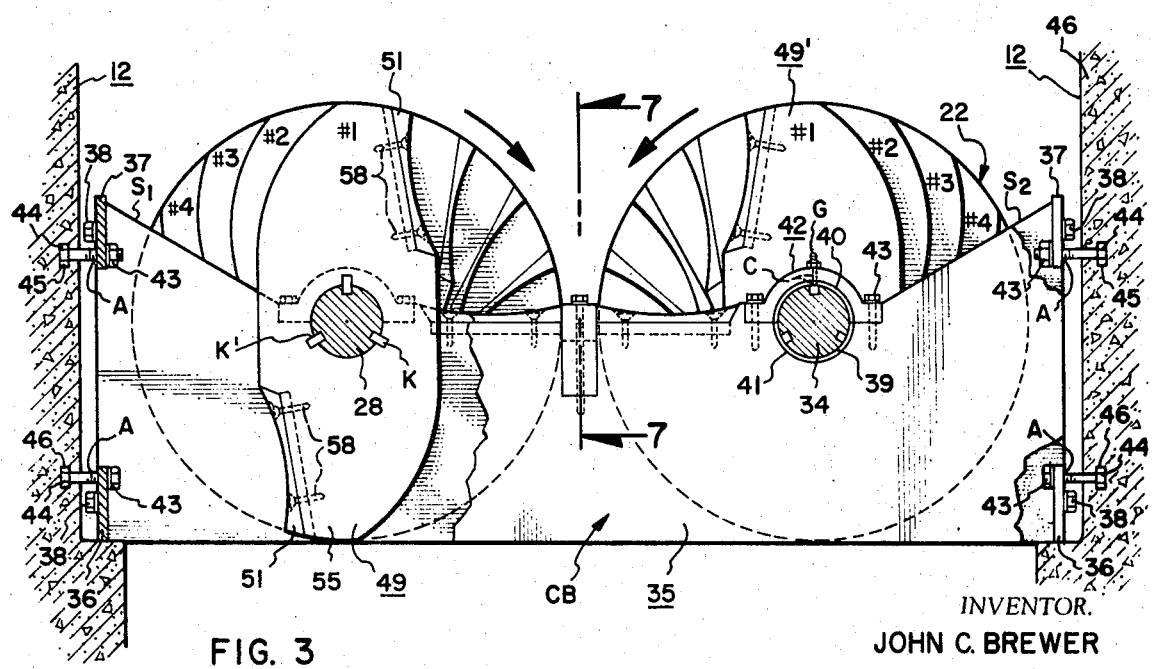
FIG. 3 is an enlarged, fragmentary side elevation taken along the line 3–3 in FIG. 1.

FIG. 3 illustrates that shafts 28 and 34 at least pass through and generally will be journaled to at least selected ones of support bases 35 of the cutter bars or spacer means CB. The structure includes a multiplicity of support bases 35 which are mutually spaced as indicated in FIG. 1. Elongate side braces 36 and 37 are disposed at opposite sides of the support bases, and attachments 38 secure these braces to the mutually spaced support bases 35.

Each respective base 35, see FIG. 5, is shown to include a bearing half 39 matching with bearing half 40. The latter is seated at 41 in bearing cap 42. Bearing cap 42 has grease fitting G cooperating with aligned lubricant apertures C, and is secured by bolt attachments 43 through the support base 35 in the manner shown in FIG. 3.

Several means are possible for securing the shredder apparatus 22 within the hopper area. One appropriate means is to provide appropriate apertures A in braces 36 and 37, this for the reception of bolt attachments 43. The latter may be secured into mounting members 44 which are precast into the cement structure at 45 and 46 of the hopper 12. Accordingly, the bolts 43 may be screwed into appropriately threaded apertures of members 44, by way of example.

Of prime importance is the inclusion of a first plurality of rotating cutter blades 49. These blades are keyed to shaft 28 by keys K and are angularly displaced, as one proceeds from one point of shaft 28 longitudinally to a remote point therealong. Thus, an imaginary line connecting the tip of one cutting portion, hereinafter described, of each blade take the form of the helix, and as to the composite tip configuration of both cutting portions, a double helix the axis of which is the axis of rotation of shaft 28. In FIG. 3, blade 49 (01) is shown nearest the viewer. The second blade 49, (02) is next adjacent the blade 01; blade 03 is next adjacent blade 02, and so forth.

A corresponding structure is seen relative to shaft 34 wherein the series of cutter blades 49 are reversed, are now designated at 49', and rotate in a counterdirection relative to that shown for blades 49. An important part of the invention is that when the cutting portions of the blades descend and coact with the cutter bars, hereinafter described, they not only perform cutting or shearing tasks but also grip the material downwardly such that subsequent blades, i.e. 02, 03, 04, and so forth, may descend and perform their intended cutting functions.

In the lower portion of FIG. 5 a representative cutter blade 49 (49') is illustrated. The same includes, in addition to keyways K', cutter blade bar seats 50 which receive the respective cutter blade bars 51. The latter are preferably concave, as illustrated, so as to perform correctly their intended function. The blade edges 52 and 52' are preferably concave, as shown, but may be flat or otherwise if so desired. Preferably, there is a downwardly oriented longitudinal rib 53 which fits into groove 54 of cutter blade member 55. The cutter blades 49 (and 49'), of course, each comprise the cutter blade member 55 and all cutter blade bars 51 secured thereto. As seen in FIG. 3, normally there will be a pair of oppositely facing cutter blade bars 51 secured to each respective cutter blade member 55. See also FIG. 3.

In referring to FIG. 5, it is seen that the individual cutter blade bars are provided with countersunk apertures, as at 56, for receiving the headed machine screws or bolts 57. The latter are threaded into suitably drilled and tapped apertures 58 as seen in FIG. 3.

It is noted that the blade bars are interchangeable and replacable and, in accordance with usual practice, are made of a hardened steel to provide suitable shearing edges at 52 and 52'. Groove 54 and longitudinal rib 53 ideally provide proper, part registration. The edges 52 and 52' may either be coplanar with or spaced outwardly from the sides S and S' of each cutter bar member 55.

Figure 4:
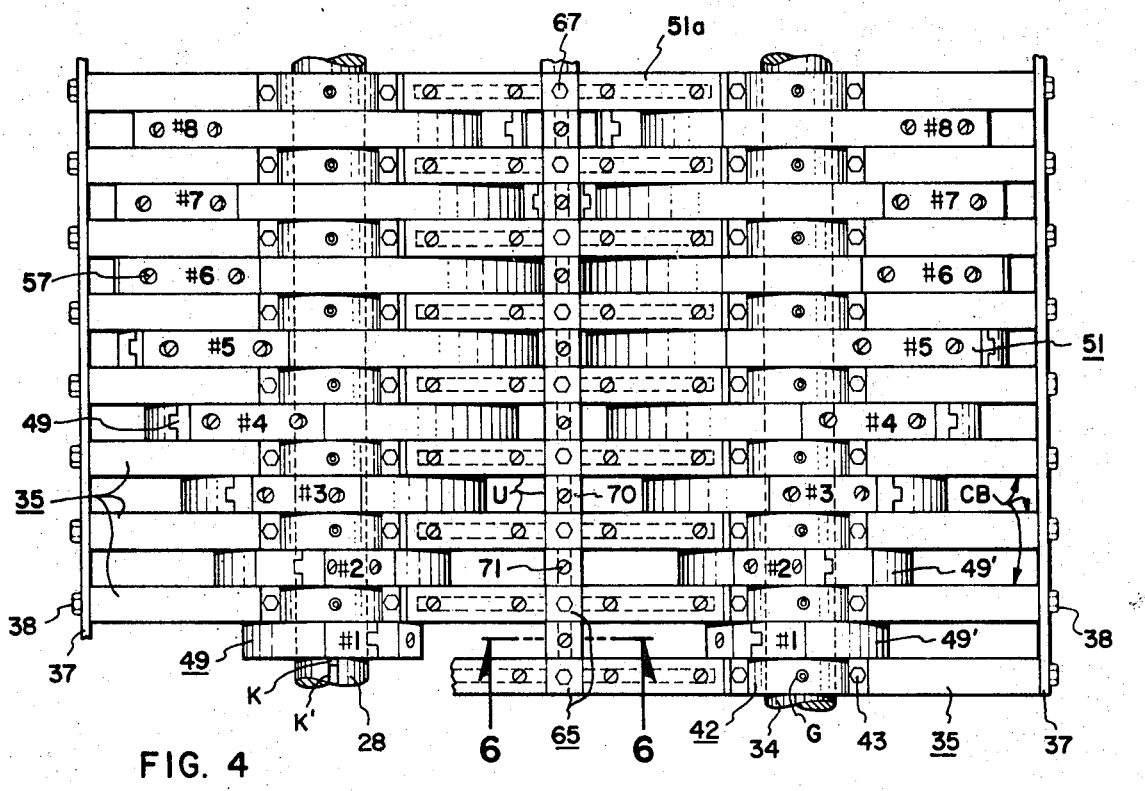
FIG. 4 is a fragmentary top plan of the structure shown in FIG. 3.

It is seen in FIGS. 4 and 5 that each of the support bases 35 includes, mounted on upper edges thereof, cutter bars 51A at each of two places. These are positioned in respective cutter bar seats 58 in a manner substantially identical, relative to cutter blade bar seat 50 at the lower portion of FIG. 5 and relating to the revolving cutter blade 49. Accordingly, it is seen that the cutter blade bars are interchangeable not only with each other, but also with the cutter bar elements 51A shown at the middle of FIG. 5. A suitable rib and slot construction for the mounting of the cutter bars 51A, as seen in FIG. 5, may be employed in the same manner as illustrated and heretofore described in connection with the cutter blade 49. Upper protuberances 60 have upper surfaces 61 which may be designed to register with surface 62 of respective bearing caps 42.

To complete the construction of the support bases 35 it is seen the same may be provided with upperwardly slanted surfaces S₁ and S₂, this for catching any material falling to the side of the hopper and permitting the same to be revolved centrally toward the cutting area of the shredding apparatus.

A continuous bar 65 is disposed in the aligned slot 66 of support braces 35 and is provided with bolt and washer attachments 67 for permitting the securement of this elongate, continuous crossbar to the mutually and preferably equally spaced support bases 35. Such securement is accomplished by the provision of vertical apertures 68 and drilled and tapped holes 69 in the respective support bases 35. The continuous elongate member 65 has, mutually spaced therealong, a series of seats 69', resembling the seats 50, for example, and which are designed to include the lowerly ribbed cutter segments 70. These latter are provided with bolts 71 which are threaded into a central aperture 72 of the elongate crossbar. Thus, the elongate member is designed to support these cutter segments which are disposed in position between adjacent ones of support bases 35. Accordingly, there is, in effect, a U-configured, composite cutting edge U, see FIG. 4, for each of the revolving cutter blades 49, and 49' as well, see FIG. 3.

The structure as above described operates as follows. At the outset, it is seen that the structure is fixedly disposed within and mounted to the hopper 12 as seen in FIG. 1. This may be accomplished with the provision of angle irons 72A, cooperating bolts and retainers 73 and 74, bracing structures 75, and so forth. The heart of the shredding apparatus 22 comprises two series of blades, each series being mounted on a counterrevolving shaft. The series of blades are so mutually spaced and mutually arranged upon their shaft such that the blades are angularly spaced as one proceeds from one end to the other of each of the respective shafts. Thus, as to direction of rotation, a first blade will approach its cutter bar, i.e. cutter bar 51A, for shearing while the next rearmost blade is closely approaching the shearing position. The first blade, hence, tends to hold the debris being cut in position for the immediately oncoming orientation of the next succeeding blade. Each blade, thus accomplishes a double function, namely, to cut and/or shear material between it and its respective cutter bar and, additionally, to tend to retain in position the material for the subsequent oncoming blade. In this manner, the operation is continuous rather than intermittent. Furthermore, adjacent blades also serve to aid each other in yet a further way. Thus, a next rearmost blade of each helical blade combination serves to pinch downwardly the material being cut by the forward blade. In this operation it is the same for each successive pair of blades. The shafts 28 and 34 are oppositely revolving in the manner indicated in FIG. 3 so that all of the material, with the aid of inclined surfaces 62 and 63, is transported toward the center of the mechanism and therein cut by the mutual action of the double series of spiral positioned blades.

Hence, the shearing apparatus operates to receive the debris 11, to urge the same centrally of the hopper, and to shred the debris appropriately at a central region of the hopper and shredding mechanism structure so that the latter may be conveniently dropped onto a conveyor belt of relative narrow girth.

While particular embodiments of the present invention have been shown and described, it will be obvious to those skilled in the art that changes and modifications may be made without departing from this invention in its broader aspects, and within the true spirit and scope of the invention.

I claim:

1. Shredding apparatus including, in combination, a plurality of horizontal, mutually spaced cutter bar means, a pair of parallel shafts journaled proximate to and disposed transversely with respect to said cutter bar means, first and second sets of mutually spaced cutter blade means keyed to said shafts, respectively, and cooperatively disposed with respect to said cutter bar means for coating therewith and passing through the spaces between adjacent cutter bar means, each of said sets of cutter blade means being comprised of cutter blades which are mutually angularly displaced, progressively, about ones of said shafts to form, compositely, helixlike cutter blade tip configurations, and means for oppositely revolving said shafts such that their upper peripheries mutually advance toward each other, thereby revolving said cutter blades in such a manner that their cutting portions descend in a region between said shafts, said cutter blades means being disposed on their respective shafts such that those respective cutter blades at corresponding shaft areas of said shafts simultaneously approach said cutter bar means together in mutual correspondence.

2. Apparatus according to claim 1 wherein said cutter blade means of each of said sets are disposed in mutual correspondence.

3. The apparatus of claim 1 wherein said cutter blades each have opposite cutting edges for coacting with said cutter bar means at the nominal end of each half cycle of shaft revolvement 4. The apparatus of claim 1 wherein each of said cutter blades includes a pair of recessed, cutter-bar-blade seats, said cutter blades including a pair of hardened, cutter-blade bars respectively secured to said seats.

5. Shredding apparatus including, in combination, a plurality of horizontal, mutually spaced cutter bar means, a pair of parallel shafts journaled proximate to and disposed transversely with respect to said cutter bar means, first and second sets of mutually spaced cutter blade means keyed to said shafts, respectively, and cooperatively disposed with respect to said cutter bar means for coacting therewith and passing through the spaces between adjacent cutter bar means, each of said sets of cutter blade means being comprised of cutter blades which are mutually angularly displaced, progressively, about respective ones of said shafts to form, compositely, helixlike cutter blade tip configurations, and means for oppositely revolving said shafts such that their upper peripheries mutually advance toward each other, thereby revolving said cutter blades in such a manner that their cutting portions descend in a region between said shafts, and wherein said cutter bar means each comprises a support base having upwardly angulated sides, and journal means for journaling said shafts thereto.

6. The apparatus of claim 1 wherein said apparatus includes an elongate crossmember tranversely disposed between said cutter blade means sets and fixedly connected to said cutter bar means.

7. The apparatus of claim 1 wherein said cutter blade means and said cutter bar means each include mutually interchangeable, hardened, cutter bar segments.

8. The apparatus according to claim 2 wherein said cutter blades are so disposed upon said shafts that corresponding ones of said cutter blades, during their cutting cycle, approach said cutter bar means together.

9. The apparatus according to claim 5 wherein said support bases include a pair of split journal bearings for supporting respective ones of said shafts, said support bases also including bearing caps constructed for journal securement over said shafts to cooperatively align with said bearing halves of said support base.

10. Shredding apparatus including, in combination, a plurality of horizontal, mutually spaced cutter bar means, a pair of parallel shafts journaled proximate to and disposed transversely with respect to said cutter bar means, first and second sets of mutually spaced cutter blade means keyed to said shafts, respectively, and cooperatively disposed with respect to said cutter bar means for coacting therewith and passing through the spaces between adjacent cutter bar means, each of said sets of cutter blade means being comprised of cutter blades which are mutually angularly displaced, progressively, about respective ones of said shafts to form, compositely, helixlike cutter blade tip configurations, and means for oppositely revolving said shafts such that their upper peripheries mutually advance toward each other, thereby revolving said cutter blades in such a manner that their cutting portions descend in a region between said shafts, and wherein said apparatus includes an elongate crossmember transversely disposed between said cutter blade means sets and fixedly connected to said cutter bar means, and wherein said elongate crossmember and said cutter bar means each include hardened cutter bar elements forming U for respective ones of said cutter blade means.

11. A shredder including, in combination, a shaft, a plurality of mutually spaced cutter blades keyed to said shaft for revolvement therewith; a plurality of mutually spaced, upstanding spacer means for defining, at adjacent sides of adjacent ones of said spacer means, travel paths for said cutter blades; supporting means disposed at opposite extremities of said spacer means for supporting said spacer means in an upright position, and means for journaling said shaft, each of said spacer means comprising a rigid base support and a replaceable cutter bar secured to an upper surface of said base support and cooperating with a respective one of said cutter blades to accomplish shredding of waste materials introduced in said shredder.

12. The shredder of claim 11 wherein said spacer means are of sufficient length that adjacent ones thereof define travel paths for respective ones of said cutter blades for both shearing descents thereof toward said spacer means and also for return travel thereof.

13. The shredder of claim 11 wherein said plural ones of said spacer means are provided with journal halves receiving said shaft, said shredder also including journal-half members releasably secured over said journal halves for journalingly containing said shaft therein, said journal halves and journal-half members comprising said journaling means.

14. The shredder of claim 11 wherein each of said cutter blades includes a cutter blade member keyed to said shaft and a replaceable, cutter blade secured to said cutter blade member whereby to supply shearing edge means therefor.

15. The shredder of claim 11 wherein each of said spacer means includes an upwardly inclined surface, extending laterally of said shaft, whereby to provide gravity feed via said angulated surface relative to materials to be cut by said cutter blades.

16. The structure of claim 11 wherein said supporting means comprises means respectively securing corresponding ones of both of said extremities of said spacer means in mutually spaced, rigidly secured relationship.

17. The shredder of claim 14 wherein said cutter blade bar is keyed to said cutter blade member.

18. The shredder of claim 17 wherein said cutter blade bar includes a longitudinally concave, lower shearing surface.

19. A shredder including, in combination, a pair of parallel shafts, means for journaling said shafts, means for oppositely revolving such shafts coupled thereto, first and second pluralities of mutually placed cutter blades respectfully keyed to respective ones said shafts for revolvement therewith; a plurality of upstanding spacer means for defining, at adjacent sides of adjacent ones of said spacer means, travel paths for said cutter blades of both of said shafts; and means for securing said spacer means together at opposite extremities thereof to form a rigid construction, each of said spacer means comprising a base support and a pair of replaceable cutter bars secured to a respective upper surface of said base support and cooperating with a respective one of said cutter blades to accomplish shredding of waste materials introduced in said shredder.

20. Structure according to claim 19 wherein said shredder includes plural, spacer elements means positioned medially between and engaging adjacent ones of said spacer means, and means for rigidly securing said spacer element means in position.

21. A shredder including, in combination, a pair of parallel shafts, means for journaling said shafts, means for oppositely revolving such shafts coupled thereto, first and second pluralities of mutually placed cutter blades respectfully keyed to respective ones said shafts for revolvement therewith; a plurality of upstanding spacer means for defining, at adjacent sides of adjacent ones of said spacer means, travel paths for said cutter blades of both of said shafts; and means for securing said spacer means together at opposite extremities thereof to form a rigid construction, each of said pluralities of cutter blades comprising individual cutter blades which are mutually angularly displaced, progressively, about respective ones of said shafts to form, compositely, helixlike cutter blade tip configurations, said cutter blades being disposed on their respective shafts such that those respective cutter blades at corresponding shaft areas of said shafts simultaneously approach said spacer means together in mutual correspondence, each of said spacer means comprising a base support and a pair of replaceable cutter bars secured to a respective upper surface of said base support and cooperating with a respective one of said cutter blades to accomplish shredding of waste materials introduced in said shredder.

22. Shredding apparatus including, in combination, structure defining a through-put opening, a plurality of parallel, upstanding, mutually spaced cutter bar means spanning said opening, means for rigidly supporting said cutter bar means, a pair of parallel shafts journaled proximate to and disposed transversely with respect to said cutter bar means, means coupled to said shafts for rotating said shafts in opposite directions, first and second sets of mutually spaced cutter blades keyed to said shafts, respectively, and cooperatively disposed with respect to said cutter bar means for coacting therewith and passing through the spaces between adjacent cutter bar means, each of said sets of cutter blades being comprised of cutter blades which are mutually angularly displaced, progressively, about respective ones of said shafts, said cutter blades being disposed on their respective shafts such that those respective cutter blades at corresponding shaft areas, as said shafts rotate, simultaneously approach said cutter bar means together in mutual correspondence.

UNITED STATES PATENT OFFICE
CERTIFICATE OF CORRECTION

Patent No. 3,578,252　　　　　　　　　Dated May 11, 1971

Inventor(s) John C. Brewer

It is certified that error appears in the above-identified patent and that said Letters Patent are hereby corrected as shown below:

Col. 2, line 11, delete "arrows" and substitute --23--.
　　　　line 35, change "43" to read --43'--.
　　　　line 54, delete "(01)" and substitute --(#1)--.
　　　　line 55, delete "(02)" and substitute --(#2)--.
　　　　line 56, delete "blade 01; blade 03 is next adjacent blade 02" and substitute --blade #1; blade #3 is next adjacent blade #2--.
　　　　line 64, delete "02, 03, 04" and substitute --#2, #3, #4--.

Col. 3, line 39, delete "slot" and substitute --slots--.

Col. 5, line 39, Claim 10, before the "U" insert --a--.
　　　　line 67, Claim 14, after "blade" insert -- bar --, first occurrence.

Col. 6, line 14, Claim 19, delete "respectfully" and substitute -- respectively --.

UNITED STATES PATENT OFFICE
CERTIFICATE OF CORRECTION

Patent No. 3,578,252       Dated May 11, 1971

Inventor(s) John C. Brewer

It is certified that error appears in the above-identified patent and that said Letters Patent are hereby corrected as shown below:

IN THE DRAWINGS

In Fig. 3 immediately to the right of the numeral 40 at the middle-right of the drawing, change "43" to --43'--. Perform the same change at the same location on the drawing illustrated under the "ABSTRACT" on the title page of the patent.

Drawing sheet 3, middle of page, immediately to the right of numeral 42 in Fig. 5, change numeral "43" to --43'--.

Signed and Sealed this fifth Day of July 1977

[SEAL]

Attest:

RUTH C. MASON
*Attesting Officer*

C. MARSHALL DANN
*Commissioner of Patents and Trademarks*